Dec. 11, 1951   R. N. JANEWAY   2,578,554
RAILWAY PASSENGER CAR TRUCK
Filed Aug. 2, 1943   4 Sheets-Sheet 1
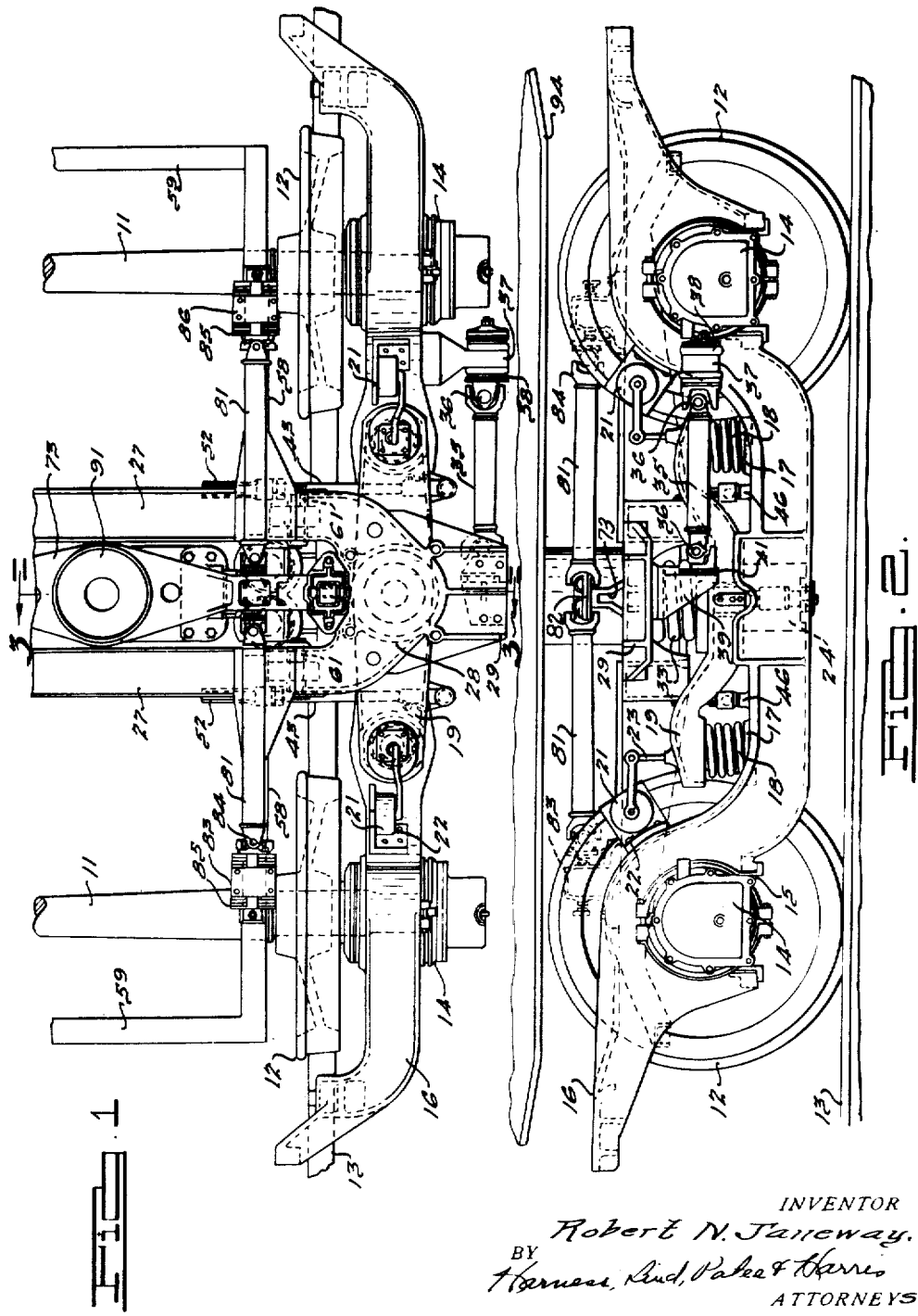
INVENTOR
Robert N. Janeway.
BY
Harness, Dick, Pake & Harris
ATTORNEYS.

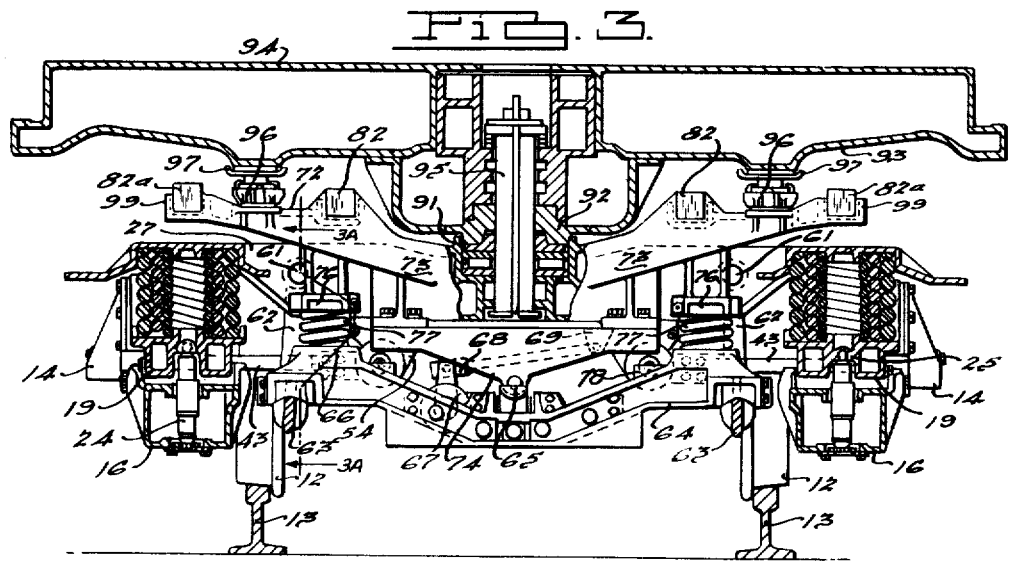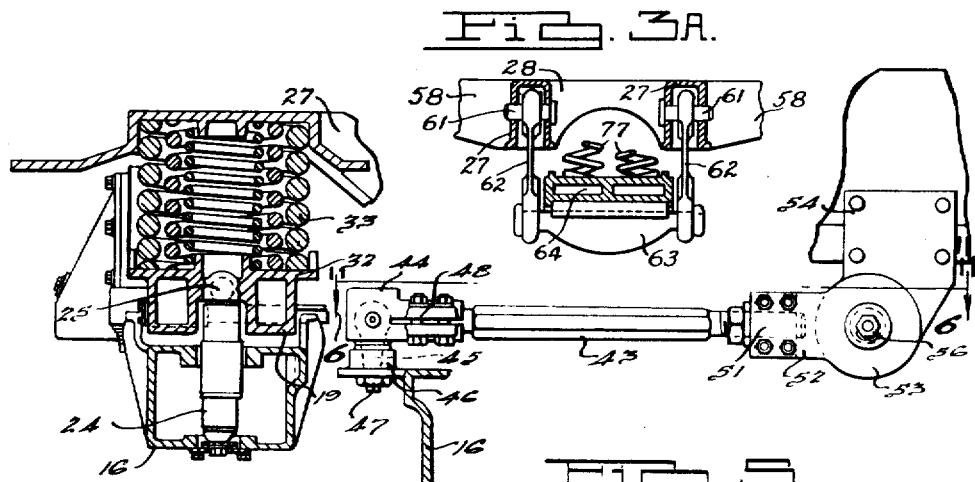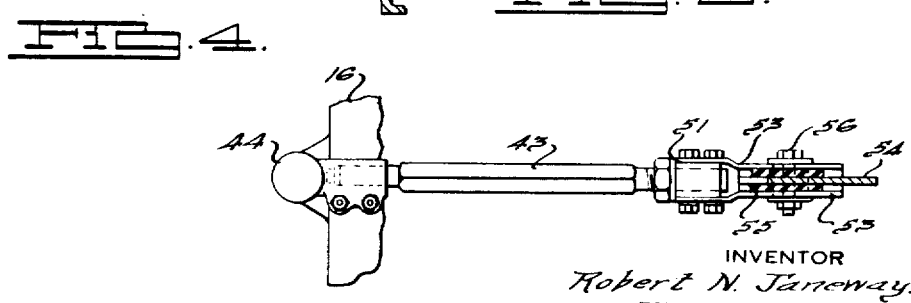

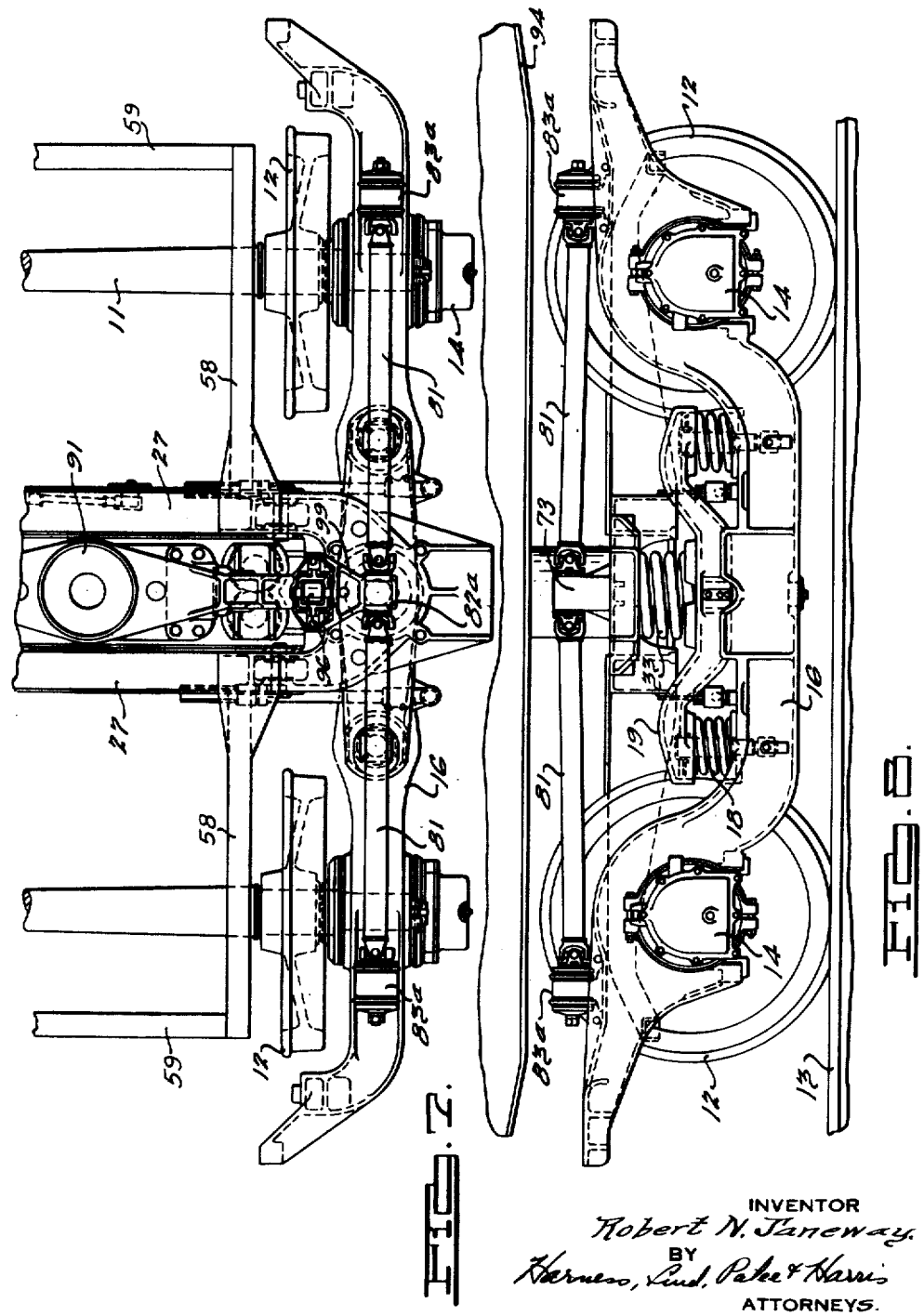

Dec. 11, 1951   R. N. JANEWAY   2,578,554
RAILWAY PASSENGER CAR TRUCK
Filed Aug. 2, 1943   4 Sheets-Sheet 4
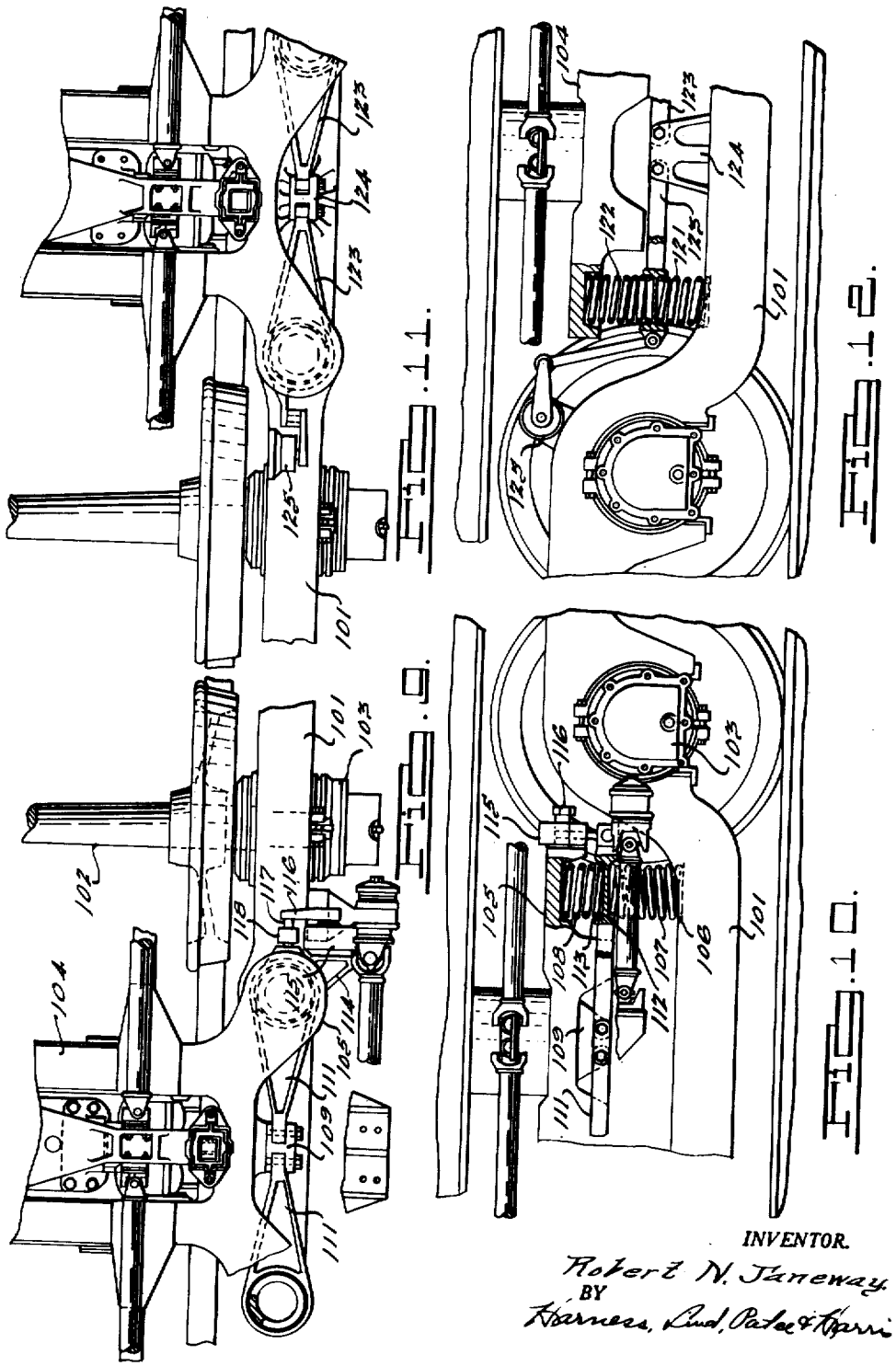
INVENTOR.
Robert N. Janeway
BY
Harness, Dickey, Pierce & Harris Patented Dec. 11, 1951

2,578,554

UNITED STATES PATENT OFFICE 2,578,554

RAILWAY PASSENGER CAR TRUCK

Robert N. Janeway, Detroit, Mich., assignor, by mesne assignments, to Chrysler Corporation, Highland Park, Mich., a corporation of Delaware Application August 2, 1943, Serial No. 496,998

43 Claims. (Cl. 105—194)

This invention relates to railway car trucks, and it has particular reference to the provision of an improved, relatively low weight truck especially suitable for passenger service, wherein the transmission of shocks and vibrations to the car body is reduced to a minimum.

Heretofore, it has been customary, in passenger car trucks, to provide a main frame structure including transversely extending members, or transoms, on which the car body has been supported, and side members, including pedestals, for engaging the axle journal boxes—the load being distributed over the side members by equalizer bars and interposed springs. Such designs, to be compatible with modern high speed conditions and fairly heavy equipment, require the use of substantial masses of metal, thereby adding to the total weight of the train, and admitting the development of sustained vibrations which interfere with the riding qualities.

According to the present invention, the customary type of integrated truck frame structure is avoided as fully as possible, consistent with railway standards. Thus, the truck frame is advantageously composed of two structurally independent major portions, one of which consists essentially of the wheels and axles, and side frames extending on either side of the truck between the axles. Herein, the common pedestal type of connection between the axles and their journal boxes is discarded, and the bearing connection and assembly is such as to preclude any substantial vertical movement of the axles with respect to the frame—although limited resiliently restrained relative motion is permissible in other directions to meet the distorting forces which are encountered. The other major portion of the truck frame is a transom structure, mounted on the side frame assembly by springs which constitute the substance of the resilient suspension for the car body, and in such fashion that the transom and its supported mass may have an unrestricted motion in a vertical direction, except as imposed by suspension springs.

While there is, in this truck, a free vertical motion, the transom and parts carried thereby are restrained from undue longitudinal and lateral motions by stabilizing members. These stabilizing members permit the truck portions to have some relative movement both lengthwise and transversely of the truck, but such motion is limited and is resisted by means which yield, preferably under both tensile and compressive forces. By dispensing with the usual pedestal journal box arrangement, and by stabilizing the truck in the manner just noted, frictional or rubbing engagements between the parts are eliminated, along with attendant joltings and progressive wear of the parts, which actions interfere with good riding qualities and cause deterioration of the performance with use.

It may also be noted that, in this improved truck, the bolster is advantageously suspended from the transom by swing links, but not through the "spring plank" arrangement which has heretofore been common in the art. To the contrary, the use of bolster springs is also avoided, the bolster, plank, and hanger assembly being what might be called a "solid" connection, as distinguished from the commonly known type wherein the bolster is resiliently mounted on the plank by springs which take the vertical or compressive load of the car body. It is through the concentration of the spring suspension between the side and transom frames, and elimination of the bolster springs, that material progress has been made in improving the riding qualities of the car, because intermediate spring mounted masses may thereby be reduced to a small fraction of the amounts which have heretofore been tolerated. And, in order to utilize the potentialities of a truck of the novel kind here under discussion, it is advantageous to employ, in the concentrated spring system, coil springs disposed in series. These should preferably differ so that one set has a lower rate of deflection than the other, but not less than half the rate of deflection of the stronger or stiffer set, although springs of equal rates of deflection may be used. Vibration damping devices, or so-called shock absorbers, are then connected across the one or stiffer set of springs only. This permits the softer or undamped portion of the suspension to act as a cushion against rail impacts, unimpeded by the tendency of the damping device to by-pass some of the shock.

Railway trucks embodying the features and principles just outlined have been found in practice to be serviceable at high speeds, and to reduce much of the jarring and high amplitude vibrations encountered in the usual forms of first class passenger rolling stock. Practical embodiments of the invention, illustrated in the accompanying drawings, will be described in detail with reference to such drawings, and there will thereafter be set forth the parts and combinations encompassed by the appended claims.

In the drawings:

Fig. 1 is a half plan view of a car truck embodying the invention;

Fig. 2 is a side elevation thereof;

Fig. 3 is a transverse section taken substantially on the line 3—3 of Fig. 1, and representing such embodiment except in certain details hereinafter pointed out;

Fig. 3A is a fragmentary sectional elevational view taken on the line 3A—3A of Fig. 3;

Fig. 4 is an enlarged fragment of the view of Fig. 3, showing the spring construction;

Fig. 5 is an enlarged view of a transversely positioned thrust link;

Fig. 6 is a plan of the link shown in Fig. 5;

Fig. 7 is a half plan view of a car truck embodying a modified form of this invention; Fig. 8 is a side elevational view of the truck construction shown in Fig. 7, this view also including a portion of the car body that is supported by the truck bolster;

Fig. 9 is a fragmentary or quarter plan view of a truck according to either of the foregoing embodiments, but modified with respect to the spring suspension system;

Fig. 10 is a fragmentary half side elevation of the truck of Fig. 9;

Fig. 11 is a view similar to Fig. 9, but showing a specifically different arrangement of the spring suspension; and, Fig. 12 is a side elevation of the truck shown in Fig. 11.

The embodiment of the invention shown in Figs. 1 to 6 inclusive comprises a pair of spaced rotatable axles 11 carrying wheels 12 which engage the track rails 13. The protruding end of each axle is journalled in a bearing assembly 14, a suitable and preferred form of which is described in a copending application, Serial No. 448,350, filed June 25, 1942, now Patent No. 2,335,120, granted November 23, 1943. These bearings are positioned in apertures 15 formed at the ends of side frames 16, in such manner as to provide a "pedestaless" type of connection, wherein the axles and bearings are precluded from vertical motion with respect to the side frames, which motion has heretofore been common in passenger car trucks. While relative vertical motion is precluded the axles have a limited and restrained motion in other planes relative to the side frames. Other forms of bearings than that specifically referred to, and which are adapted to the same purpose, may of course be used.

Each of the side frames 16 is structurally independent of the other—the usual form of truck frame including side members rigidly interconnected by crossbeams being dispensed with. In the present construction, the axles are secured to each other longitudinally of the truck by the two side frames 16, to provide a parallelogram linkage which squares or aligns the axles with respect to the remainder of the truck structure. Only a limited amount of distortion from shock and roadbed irregularities occurs in this unit, which constitutes the basic load carrying structure of the entire truck.

The frames 16 are provided with longitudinally spaced seats 17, on which are positioned coiled springs 18, through which the car load is applied to the side frames. These springs have a relatively high rate of deflection, in terms of force required to produce a given change in length, or they are "hard." They provide supports on each side frame for beam members 19, through which the load is transmitted. Each spring 18 is moreover damped by a shock absorber 21, advantageously of the hydraulic type, mounted on a bracket 22 secured to the side frame, and connected by a link 23 to the beam 19 adjacent the end of the coil 18. In Figs. 2, 3 and 4, there is illustrated another shock absorber 24, extending through the side frame 16 and anchored to the central part of the beam 19 by a ball and socket joint 25. This may be used alternatively to or in conjunction with the shock absorbers 21, although for many classes of service the members 24 may be omitted—damping being obtained through the shock absorbers 21.

The beams 19 provide a mounting means for a second load carrying structure or transom frame, shown in half plan in Fig. 1, and in transverse section in Fig. 3. This frame comprises spaced members 27, extending transversely of the truck, which are joined at their ends by curved sections 28 which overlie the beam 19, and from which extend overhanging flanges 29. The sections 28 are formed with seats, as shown in Fig. 4, aligned with complementary seats 32 formed on the beams 19 at their centers, to receive nested coiled springs 33. The springs 33 are "soft," compared to the springs 18, but they preferably have a rate of not less than half the rate of the latter. No damping means corresponding to the members 21 or 24 are placed across the soft springs 33, because it is desired that the soft springs should have complete freedom of vertical movement to cushion the car against the impacts of the wheels on the rails, or the track irregularities, which may be transmitted to the beams 19. It will be seen that the system is so arranged that there are two sets of coiled springs in series—namely, the hard springs 18 and the soft springs 33, with shock absorbers or damping means across the hard springs only. By so damping the hard springs 18, the transmissibility of shocks is not materially increased, but the development of resonant vibrations in the beam 19, and the parts carried thereby, is curtailed. Also, due to the series arrangement, the movement of the transom and its associated mass is damped. This suspension has been found to decrease considerably all vertical disturbances of the car body, particularly when the spring rates satisfy the differential relationship heretofore described.

The transom frame, while having a substantially free vertical suspension on the side frame structure, is stabilized both longitudinally and transversely with respect to the wheels and axles by resilient means which permit very limited motion in these directions. As shown in Figs. 1 and 2, longitudinal stability is imparted by thrust links 35, having universal joint connections 36 at each end which are coupled to the side frame 16 and the transom frame respectively. The side frame connection is made through an outstanding bracket 37 formed with an eye to receive the appropriate stem portion of a joint 36, which is faced with rubber washers or "doughnuts" 38 on either side to provide for a limited longitudinal flexibility under both tensile and compressive stresses. The connection to the transom is effected by means of a depending bracket 39, secured to the underside of the flange 29, and to which the appropriate portion of the joint 36 is bolted—shims 41 being inserted for purposes of adjustment. Two of these links per truck have been found adequate, and it is considered the better practice to extend them in opposite directions, as viewed in plan, on the two side frames 16. They may, of course, both extend the same way if desired, so that they would appear alternately on the right and left, as one walks around the truck to inspect them.

Transverse stabilization of the transom with respect to the side frames is effected by means of four links 43, extending inwardly from the side frames 16 in general parallelism to the transom members 27. Their construction and mode of connection is best shown in Figs. 5 and 6. A ball joint 44 is provided with a tapered post 45 which passes through a boss 46 to receive a securing nut 47. The outer portion of the joint 44 is formed with a clamp 48 which embraces one end of the link 43. The inner end of the link is threaded and clamped into a tapped section 51 of a fitting 52, formed with spaced eyes 53 which span a plate 54 bolted to the transom section 27. Centrally perforated discs 55, composed of rubber or like resilient material, occupy the spaces between the plate and the eyes, and this assembly is integrated by vulcanizing or otherwise bonding the rubber to the metal surfaces, prior to connecting the fitting to the link. The bonded assembly is further secured by a through bolt 56, which, when installed, is drawn up by its nut sufficiently to protect the parts against dissociation. It will accordingly be apparent that the transom is free to have vertical movement—the links 43 pivoting on the ball joints 44 and the rubber yielding in torsion. In transverse or horizontally imposed thrusts, however, the links yield but slightly through the rubber—the lateral shearing strain in the discs providing the yielding resistance.

The transom members 27 have secured thereto longitudinally extending frame sections 58 which are transversely connected to other sections 59. These carry portions of the brake rigging, the details of which are not essential to the present invention, and are therefore omitted for purposes of clarity.

The transom frame just described provides a support for the weight of the car body through the medium of a bolster, plank, and swing hanger assembly. The sections 27 (see Fig. 3A) are formed with aligned, longitudinally disposed, apertures on each end, each of which receives a pin 61 from which depends a hanger arm 62. The lower portions of the arms 62 are pierced to receive cross bars 63, on which are positioned the ends of a transversely disposed plank 64. In the embodiment of the invention illustrated in Fig. 3, the central portion of the plank 64 is formed with a bearing seat 65, and the end portions are provided with spring seats 66. Undue lateral swaying of the plank on the hanger arms and links is forestalled by the provision of a pair of shock absorbers 67, connected between the plank and each transom section 27. Since Fig. 3 is a sectional view, only one appears therein, being shown as bolted to the plank to one side of the center line, and connected, through its operating arm, and a pivoted link 68, to a plate 69 depending from the frame 27.

The plank 64 supports a truck bolster 72 having a transversely extending upper portion 73 positioned between the transom members 27, and a depending portion formed at its lower end with a bearing 74 engaging the seat 65. The extremities of the depending portion are formed with spring seats 76 which overlie the seats 66 on the plank, to imprison coil springs 77. Rocking motion between the plank and bolster is therefore attainable, subject to the resistance of the springs, which are advantageously preloaded, thereby to neutralize torsional forces due to differential vertical rail disturbances at opposite sides of the truck. Spaced rubber pads may also be positioned on blocks 78, formed on the plank, to provide stops for the rocking action. In a variant of the invention, the rocking mounting may be replaced by a non-rocking construction, but the construction just described has several advantages, and accordingly it is preferred to the fixed type. It will be noted in either case that there is no relative vertical motion between the bolster and plank—the vertical motion being attained in the springs 18, 33, heretofore described. The elimination of the usual intermediate, inherently vibratory, suspended mass of the conventional types of trucks is thereby attainable. It will be noted that, since the lateral motion of the plank 64 is restricted by the shock absorbers 67, the sideways movement of the bolster is also limited, and is held within such limits as to reduce the bumping of the bolster against the end portions 28 of the transom frame.

The bolster 72 is restrained from longitudinal movement, and is held from engagement with the inner surfaces of the frame members 27, by four thrust links 81, extending lengthwise of the truck and positioned on either side thereof. Each link is connected, at one end, to a bracket plate 82 located on the bolster, a universal joint and shim fitting being employed, as with one end of the thrust links 35. The other end of each link 81 extends over a transom frame member 58, and is connected to a bracket 83 secured thereto through a universal joint 84. The bracketed section of the joint 84 is connected to the bracket 83 through rubber pads 85 which permit the link 81 to have a limited motion in each longitudinal direction, but which resiliently resist such motion under both tensile and compressive loads. This connection is secured by a cap plate 86. The universal joints, of course, permit the bolster to have vertical and lateral movement, insofar as the links 81 are concerned.

The central portion of the bolster 72 is formed with a center bearing 91 which receives a complementary bearing portion 92 formed on a body bolster 93, secured to the underside of the car body 94. A center locking pin 95 extends between the two bolsters, to secure the truck to the car, while permitting relative turning movement as the train goes around a curve. The truck bolster 72 is also provided with side bearings 96 adapted to engage wear plates 97 on the body bolster 93 as the body tips to one side.

It will be understood that the load of the car and its contents is transferred to the truck bolster 72 and plank 64, and thence through the swing hangers 62 to the transom frame, which is one of the major load carrying frames. The transom, in turn, rests on the springs 33, which are positioned on the beams 19, mounted on the side frame units 16 by the springs 18. The mass of the beams 19 is, of course, small in comparison to that of the entire truck, and therefore there is no large intermediate mass to be set into sustained vibrations which vibrations can be transmitted to the car body. While the various thrust links and shock absorbers eliminate the banging of one part of the truck against the other, with consequent development of shocks, and maintain the parts in alignment, they do not hamper the cushioning action of the springs 33, and therefore easy riding qualities are obtainable. It may also be observed that while the parts are of adequate strength to withstand the forces encountered, the total weight of each truck is low, in comparison with trucks heretofore utilized for passenger service.

The modification of the invention shown in Figs.

7 and 8 illustrates an alternative location for the thrust link 81, in such manner that the links 35 may be omitted. Instead of securing the bolster end of the links 81 to the pads 82, as previously described, they are connected to the pads 82a, provided on extension pieces 99 lying beyond the side bearings 96, and over the side frames 16. The opposite ends of the links 81 are then connected directly to the brackets 83a, secured to the upper portions of the side frames, in the manner heretofore described. Longitudinal movement between the bolster and the side frames is thus restrained, and the links 35 can be eliminated. The transom floats, and is relatively free from longitudinal thrusts from the side frames. It should, however, be pointed out that better riding qualities of the car as a whole are obtained with the first described form, and, when it is adopted, the extension pieces 99 on the bolster 72 may be omitted, with some saving in total weight and proportionate cost.

Figs. 9, 10, 11 and 12 illustrate modifications of the previously described spring suspension system whereby the intermediate sprung mass of the beam 19 is eliminated, thereby further adding to the riding qualities and reducing the total weight of the truck. According to these views, there is, however, still retained the combination of the relatively soft and hard springs in series, with the damping device connected across the harder spring set, the springs being separated by means of pivoted shelves which are connected to the transom or side frames, as the case may be.

Considering first the structure of Figs. 9 and 10, there is indicated a side frame 101 connected to an axle 102 by a bearing 103, and adapted to support the transverse portion of a transom frame 104, all as has been heretofore described. The frame 104 is, however, formed with two longitudinally spaced side frame overlapping end portions 105, which are aligned with underlying spring seats 106 provided on the side frame 101 intermediate the bearings 103. Interposed between the end portions 105 and the seats 106 are coiled springs 107, 108 which are arranged in series—the lower spring 107 being a relatively soft spring, and the upper spring 108 being relatively hard or stiff. It will be noted that this reverses the arrangement heretofore described, wherein the hard spring 18 was located on the side frame.

The transom frame 104 is formed, between the end portions 105, with depending bosses 109 symmetrically disposed with respect to the transverse center line of the structure. To each boss is pivoted, for motion up and down, or about a transverse horizontal axis, a shelf or plate member 111, whose outer end is large enough to provide seats 112 and 113 for the soft and hard springs respectively, and which therefore forms a partition between the two springs. The adjacent part of the end portion 105 is formed with a bracket 114 on which is mounted a damping device or rotary vane type shock absorber 115, having an arm 116 which is pivotally connected to a link 117 whose opposite end is pivoted to a bracket 118 formed on or secured to the shelf 111.

The remaining portions of the truck may, of course, be the same as has heretofore been described, and therefore further illustration and description appears superfluous. The undamped soft springs 107 have freedom of vertical movement which cushions the transom, bolster, and car body against the road impacts and shocks, while the damping devices across the springs 108 safeguard the system against the development of resonant vibrations at any speed, which could impart a jarring sensation and action to the car body. Relative vertical motion between the transom and side frames is accommodated by the pivoted shelf 111, whose mass is less than that of the previously described beam 19, and which mass is also partially integrated with, or made a part of, the suspended mass of the transom and associated parts. It will therefore be seen that intermediate spring-suspended masses are practically reduced to a negligible quantity.

The suspension shown in Figs. 11 and 12 is similar to that of Figs. 9 and 10, insofar as the side and transom frame structures are concerned. Here, however, the lower, side frame supported spring 121 is the hard spring, as in the first described embodiments, while the upper spring 122 is made the relatively soft spring. The shelf 123 is like the shelf 111, except that it is now pivoted to the side frame 101 by means of a bracket 124 formed thereon, and its outer end is linked to a shock absorber 125, mounted on the side frame in similar fashion to the shock absorbers 21 of Fig. 1. The beam 19 is therefore eliminated and is replaced by a relatively light structural element, but the hard spring 121 is again returned to the side frame, to function in the manner heretofore described.

Hereinabove, the springs in series have been specified as being of different rates, since that is preferable to springs having identical rates. However, as initially noted, springs having the same rates may be employed, being divided by the beam, shelf, or like intermediate member, with the shock absorber positioned across one spring only. It will be appreciated that, under impact conditions, the liquid in the shock absorber is subjected to great pressure, and not being capable of instantaneous flow, it acts as a solid column which can transmit the impact. By having the springs in series, one portion is therefore always free to yield, or to be compressed, while the damping device itself imparts necessary stability, and responds to the minor disturbances which are encountered. In this manner, the severe impacts are not transmitted to the car body, as would be the case if the damping device bridged the entire spring system.

Any compression of the spring system will, of course, result in a total deflection equal to the sum of the individual deflections of the several springs. These individual deflections will, in turn, be inversely proportional to the various rates. For good operating conditions, the ports and passages of the shock absorbers should be so adjusted as to produce a resistance required to absorb the energy causing the entire displacement. That is to say, if the total deflection of the body is D inches, which equals $d_1+d_2$, or the sum of the deflections of each spring, then the resistance of the shock absorber should be progressively increased as the spring across which it is connected is made harder than the other. In such event, the resistance can be expressed as $$R = \frac{KD}{d_2}$$

when K is a constant and $d_2$ the deflection rate of the spring it bridges. Knowing from actual design values what deflections and rates are to be employed, the resistance of the shock absorber may then be readily computed.

While the invention has been described with respect to a preferred form of truck and various modifications thereof, and while some of the elements utilized are recognized as being old by themselves, it is nevertheless to be understood that the invention is susceptible of numerous other modifications and changes without departure from its principles, or the scope thereof as encompassed by the following claims. The instant specification, moreover, contains subject matter in common with my prior application Serial No. 425,273, filed January 1, 1942. This application therefore forms a continuation in part of application 425,273 which has since become abandoned. For all such subject matter, the lawful benefits of the earlier filing date are asserted.

I claim:

1. In a railway vehicle truck, a truck bolster, a transom frame, means including swing links for mounting said bolster on said transom frame; a plurality of axles; side frame members carried by said axles, and means for mounting said transom frame on said side frame members comprising an intermediate member disposed in parallelism with each of said side frame members; sets of coil springs respectively operatively disposed between said intermediate member and the transom frame and side frame members, said sets of springs differing in rate in a ratio of approximately 2 to 1, and a shock absorber operatively connecting said intermediate member with one of said frames.

2. In a railway vehicle truck, a truck bolster, a transom frame, means including swing links for mounting said bolster on said transom frame; a plurality of axles, side frame members carried by said axles, and means for mounting said transom frame on said side frame members comprising an intermediate member disposed in parallelism with each of said side frame members, sets of coil springs respectively operatively disposed between said intermediate member and the transom frame and side frame members, said sets of springs differing in rate in a ratio of approximately 2 to 1, and a shock absorber operatively connected across the stiffer set of springs.

3. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a transom frame resiliently mounted on and extending between the equalizer members and being free of direct cooperation with longitudinally spaced parts of each equalizer member and regions of the axles adjacent the equalizer members such as would prevent relative transverse and longitudinal movement of the transom frame and the equalizer members, and link means pivotally connecting the transom frame and the equalizer members for restraining relative transverse movement and permitting relatively unrestrained vertical movement.

4. A railway truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a transom frame resiliently mounted on and extending between the equalizer members and being free of direct cooperation with longitudinally spaced parts of each equalizer member and regions of the axles adjacent the equalizer members such as would prevent relative transverse and longitudinal movement of the transom frame and the equalizer members, and links pivotally connecting the transom frame and the equalizer members for relatively unrestrained vertical movement and restrained relative transverse movement, any one link being pivotally connected to only one equalizer member.

5. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a transom frame resiliently mounted on and extending between the equalizer members and being free of cooperation with longitudinally spaced parts of each equalizer member and regions of the axles adjacent the equalizer members such as would prevent relative transverse and longitudinal movement of the transom frame and the equalizer members, a first link means pivotally connecting the transom frame and the equalizer members for restraining relative transverse movement and permitting relatively unrestrained vertical movement, and a second link means pivotally connecting the transom frame and the equalizer members for restraining relative longitudinal movement and permitting relatively unrestrained vertical movement.

6. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a transom frame resiliently mounted on and extending between the equalizer members and being free of direct cooperation with longitudinally spaced parts of each equalizer member and regions of the axles adjacent the equalizer members such as would prevent relative transverse and longitudinal movement of the transom frame and the equalizer members, and links pivotally connecting the transom frame and the equalizer members for relatively unrestrained vertical movement and restrained relative transverse movement, any one link being pivotally connected to only one equalizer member, and link means pivotally connecting the transom frame and the equalizer members for restraining relative longitudinal movement and permitting relatively unrestrained vertical movement.

7. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a transom frame resiliently mounted on and extending between the equalizer members and being free of direct cooperation with longitudinally spaced parts of each equalizer member and regions of the axles adjacent the equalizer members such as would prevent relative transverse and longitudinal movement of the transom frame and the equalizer members, a bolster mounted on the transom frame, a first link means connecting the transom frame and the equalizer members for restraining relative transverse movement and permitting relatively unrestrained vertical movement, and a second link means connecting the bolster and the equalizer members for restraining relative longitudinal movement and permitting relatively unrestrained vertical movement.

8. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a beam member extending longitudinally of and positioned intermediate the ends of each equalizer member and resiliently mounted on the associated equalizer member, a transom frame resiliently mounted on and extending between the beam members and being free of direct cooperation with longitudinally spaced parts of each equalizer member and regions of the axles adjacent the equalizer members such as would prevent relative transverse and longitudinal movement of the transom frame and the equalizer members, a bolster mounted on the transom frame, a first link means connecting the transom frame and the equalizer members for restraining relative transverse movement and permitting relatively unrestrained vertical movement, a second link means connecting the bolster and the transom frame for restraining relative longitudinal movement and permitting relatively unrestrained vertical movement, and a third link means connecting the transom and the equalizer members for restraining relative longitudinal movement and permitting relatively unrestrained vertical movement.

9. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a transom frame resiliently mounted on and extending between the equalizer members and being free of direct cooperation with longitudinally spaced parts of each equalizer member and regions of the axles adjacent the equalizer members such as would prevent relative transverse and longitudinal movement of the transom frame and the equalizer members, a bolster mounted on the transom frame, links connecting the transom frame and the equalizer members for relatively unrestrained vertical movement and restrained relative transverse movement, any one link being connected to only one equalizer member, and link means connecting the bolster and the equalizer members for restraining relative longitudinal movement and permitting relatively unrestrained vertical movement.

10. In a railway vehicle, a transom frame, a bolster, means mounting the bolster on the transom frame so as to prevent relative resilient vertical movement of the bolster with respect to the transom frame and to provide for relative horizontal movement, a wheel-connected member, an intermediate member, a first elastic supporting means between the wheel-connected member and the intermediate member, a second elastic supporting means between the intermediate member and the transom frame, one elastic supporting means being relatively stiff and the other relatively soft, and damping means connected only across the relatively stiff elastic supporting means to absorb energy, upon all relative movement of the parts toward and away from one another between which the relatively stiff elastic supporting means is connected and to leave the relatively soft elastic supporting means free to cushion impact.

11. In a railway vehicle, a transom frame, a bolster, means mounting the bolster on the transom frame so as to prevent relative resilient vertical movement of the bolster with respect to the transom frame and to provide for relative horizontal movement, spaced axles, spaced equalizers extending between the axles, intermediate members, a first pair of elastic supporting means between the equalizers and the intermediate members, a second pair of elastic supporting means between the intermediate members and the transom frame, one pair of elastic supporting means being relatively stiff and the other pair of elastic supporting means being relatively soft, and damping means connected only across one pair of elastic supporting means to absorb energy upon all relative movement of the parts toward and away from one another between which the said one pair of elastic supporting means is connected and to leave the other pair of elastic supporting means free to cushion impact.

12. In a railway vehicle, a transom frame, a bolster, means mounting the bolster on the transom frame so as to prevent relative resilient vertical movement of the bolster with respect to the transom frame and to provide for relative horizontal movement, an intermediate member, a relatively soft spring between the transom frame and the intermediate member, a side frame, a pair of longitudinally spaced relatively stiff springs between the side frame and the intermediate member, and a pair of longitudinally spaced dampers located adjacent the said pair of stiff springs between the side frame and the intermediate member for damping vertical oscillations transmitted to the intermediate member and pitching oscillations developed by virtue of the longitudinal spacing of the pair of relatively stiff springs.

13. In a railway vehicle, a transom frame, a bolster, means mounting the bolster on the transom frame so as to prevent relative resilient vertical movement of the bolster with respect to the transom frame and to provide for relative horizontal movement therebetween, a side frame, an intermediate member, a relatively soft spring between the transom frame and the intermediate member, a pair of longitudinally spaced relatively stiff springs between the side frame and the intermediate member, and a pair of longitudinally spaced dampers located adjacent the said pair of stiff springs between the said side frame and the intermediate member for damping vertical oscillations transmitted to the intermediate member and pitching oscillations developed by virtue of the longitudinal spacing of the pair of relatively stiff springs and stabilizing link means connected between the side frame and the transom frame for restraining relative transverse and longitudinal movement between said frames while permitting relatively unrestrained vertical movement therebetween.

14. In a railway vehicle, a transom frame, a bolster, means mounting the bolster on the transom frame so as to prevent relative resilient vertical movement of the bolster with respect to the transom frame and to provide for relative horizontal movement therebetween, a side frame, an intermediate member, means pivotally connecting the intermediate member to one of the frames, a relatively soft elastic supporting means between the intermediate member and one frame, a relatively stiff elastic supporting means between the intermediate member and the other frame, and damping means connected between the frame member and intermediate member connected by the relatively stiff elastic supporting means to absorb energy upon all relative vertical movement of these members toward and away from one another between which the relatively stiff elastic supporting means is connected, the damping means being arranged to leave the relatively soft elastic supporting means free to cushion impact loads applied to the side frame.

15. In a railway vehicle, a transom frame, a bolster, means mounting the bolster on the transom frame so as to prevent relative resilient vertical movement of the bolster with respect to the transom frame and to provide for relative horizontal movement therebetween, a side frame, a pair of intermediate members, means pivotally connecting the intermediate members to one frame, a pair of relatively soft elastic supporting means between the intermediate supporting members and one frame, a pair of relatively stiff elastic supporting means between the intermediate supporting members and the other frame, and damping means connected between the frame member and the intermediate members connected by the pair of relatively stiff elastic supporting means to absorb energy upon all relative vertical movement of these members toward and away from one another between which the pair of relatively stiff elastic supporting means is connected, the damping means being arranged to leave the relatively soft elastic supporting means free to cushion impact loads applied to the side frame.

16. In a railway vehicle specified in claim 15, the intermediate members being pivoted to the frame on which the pair of relatively stiff elastic supporting means and the damping means are located.

17. In a vehicle, a body-connected member, a wheel-connected member, an intermediate support pivotally connected to one of the members, a relatively soft elastic supporting means between one member and the intermediate support, a relatively stiff elastic supporting means between the other member and the intermediate support, and damping means connected only across the relatively stiff elastic supporting means to absorb energy upon all relative movement of the parts toward and away from one another between which the relatively stiff elastic supporting means is connected and to leave the relatively soft elastic supporting means free to cushion impact.

18. In a vehicle, a body-connected member, a wheel-connected member, a pair of intermediate supports pivotally connected to one of the members and extending between the members in opposite directions from the points of pivotal connection, a pair of relatively soft elastic supporting means between one member and the intermediate supports, a pair of relatively stiff elastic supporting means between the other member and the intermediate supports, and damping means connected only across the pair of relatively stiff elastic supporting means to absorb energy upon all relative movement of the parts toward and away from one another between which the pair of relatively stiff elastic supporting means is connected and to leave the relatively soft elastic supporting means free to cushion impact.

19. A railway car truck construction comprising a pair of axles spaced and generally parallel to one another, equalizer members extending in generally parallel relation between the axles adjacent their ends and connected thereto, a transom frame, a bolster, means mounting the bolster on the transom frame so as to prevent substantial relative resilient vertical movement of the bolster with respect to the transom frame and to provide for relative horizontal movement therebetween, a first intermediate support located between and spaced from the transom frame and one equalizer member, a second intermediate support located between and spaced from the transom frame and the other equalizer member and being entirely independent of the first equalizer support, a first set of two resilient supporting means arranged in series generally in a longitudinal vertical plane adjacent the said one equalizer member, one resilient means between the said one equalizer member and the first intermediate support and the other between the transom frame and the first intermediate support, and a second set of two resilient supporting means arranged in series generally on a longitudinal vertical plane adjacent the said other equalizer member, one resilient means between the said other equalizer member and the second intermediate support and the other between the transom frame and the second intermediate support.

20. The vehicle specified in claim 19 and further including a first damping means connected across one resilient supporting means of the first set to damp vibrations thereof and a second damping means connected across the one resilient supporting means of the second set to damp vibrations thereof.

21. A railway car truck construction comprising a pair of axles spaced and generally parallel to one another, equalizer members extending in generally parallel relation between the axles adjacent their ends and connected thereto, a transom frame, a bolster, means mounting the bolster on the transom frame so as to prevent substantial relative resilient vertical movement of the bolster with respect to the transom frame and to provide for relative horizontal movement therebetween, a first intermediate support located between and spaced from the transom frame and one equalizer member, a second intermediate support located between and spaced from the transom frame and the other equalizer member and being entirely independent of the first intermediate support, a first set of three coil springs arranged generally in a vertical longitudinal plane adjacent the said one equalizer member, two springs being in parallel longitudinally spaced relation between the first intermediate support and the said one equalizer member and the third spring being between the first intermediate support and the transom frame and, a second set of three coil springs arranged generally in a vertical longitudinal plane adjacent the said other equalizer member, two springs being in parallel longitudinally spaced relation between the second intermediate support and the said other equalizer member and the third spring being between the second intermediate support and the transom frame, and link means connected between the transom frame and the equalizer members permitting substantially unrestrained relative vertical movement between the link connected elements while restraining relative longitudinal and transverse movement therebetween.

22. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a transom frame extending between the equalizer members and being free of direct cooperation with longitudinally spaced parts of each equalizer member and regions of the axles adjacent the equalizer members such as would prevent relative transverse and longitudinal movement of the transom frame and the equalizer members, link means connecting the transom frame and the equalizer members for restraining relative transverse movement and permitting relatively unrestrained vertical movement, a first intermediate support located between the transom frame and one equalizer member, a second intermediate support located between the transom frame and the other equalizer member and being entirely independent of the first equalizer support, a first set of two resilient supporting means arranged in series generally in a longitudinal vertical plane adjacent the said one equalizer member, one resilient means between the said one equalizer member and the first intermediate support and the other between the transom frame and the first intermediate support, and a second set of two resilient supporting means arranged in series generally in a longitudinal vertical plane adjacent the said other equalizer member, one resilient means between the said other equalizer member and the second intermediate support and the other between the transom frame and the second intermediate support.

23. The construction specified in claim 22 and further including a first damping means connected between said one equalizer and said first intermediate support to control one resilient supporting means of the first set and a second damping means connected between said other equalizer and said second intermediate support to control the corresponding resilient supporting means of the second set.

24. A railway car truck construction comprising a pair of axes spaced and generally parallel to one another, equalizer members extending in generally parallel relation between the axles adjacent their ends and connected thereto in independent self-contained connections resiliently resisting unsquaring of the axles and the equalizer members, a transom frame extending between the equalizer members and being free of direct cooperation with longitudinally spaced parts of each equalizer member and regions of the axles adjacent the equalizer members such as would prevent relative transverse and longitudinal movement of the transom frame and the equalizer members, link means connecting the transom frame and the equalizer members for restraining relative transverse movement and permitting relatively unrestrained vertical movement, a first intermediate support located between the transom frame and one equalizer member, a second intermediate support located between the transom frame and the other equalizer member and being entirely independent of the first equalizer support, a first set of coil springs arranged in series generally in a longitudinal vertical plane adjacent the said one equalizer member, at least one spring of the first set being between the transom frame and the first intermediate support, at least one spring of the first set being between the said one equalizer member and the first intermediate support, a second set of coil springs arranged in series generally in a longitudinal plane adjacent the said other equalizer member, at least one spring of the second set being between the transom frame and the second intermediate support, at least one spring of the second set being between the said other equalizer member and the second intermediate support, a bolster, and means mounting the bolster on the transom frame providing against relative resilient vertical movement of the bolster with respect to the transom frame and to provide for relative horizontal movement.

25. In a railway truck, an axle and wheel, a journal box carried thereby, an equalizer supported upon the journal box and extending longitudinally of the truck, the equalizer and journal box being movable together vertically of the truck and being held against relative movement longitudinally of the truck, a load carrying truck frame spring-supported on the equalizer and free of association with the journal box except through the equalizer, and an elongated anchor rod extending transversely of the truck and connected at its end portions to the equalizer and to the load carrying frame to hold the equalizer and load carrying frame against substantial movement relative to each other transversely of the truck but accommodating their movement relative to each other in a vertical direction.

26. In a railway truck, an axle and wheel, a journal box carried thereby, an equalizer supported upon the journal box and extending longitudinally of the truck, the equalizer and journal box being movable together vertically of the truck and being held against relative movement longitudinally of the truck, a load carrying truck frame spring-supported on the equalizer and free of association with the journal box except through the equalizer, and anchor means arranged adjacent the equalizer and the truck frame with the end portions connected, respectively, to the equalizer and to the truck frame to hold the equalizer and the truck frame against substantial movement relative to each other transversely of the truck but accommodating their movement relative to each other in a vertical direction.

27. A railway car truck construction comprising a pair of axles spaced and generally parallel to one another, equalizer members extending in generally parallel relation between the axles adjacent their ends and connected thereto in independent self-contained connections resisting unsquaring of the axles and the equalizer members, a transom frame resiliently mounted on and extending between the equalizer members and being free of direct cooperation with longitudinally spaced parts of each equalizer member and regions of the axles adjacent the equalizer members such as would prevent relative transverse and longitudinal movement of the transom frame and the equalizer members, and link means pivotally connecting the transom frame and the equalizer members for restraining relative transverse movement and permitting relatively unrestrained vertical movement.

28. A railway truck construction comprising a pair of axles spaced and generally parallel to one another, equalizer members extending in generally parallel relation between the axles adjacent their ends and connected thereto in independent self-contained connections resisting unsquaring of the axles and the equalizer members, a transom frame resiliently mounted on and extending between the equalizer members and being free of direct cooperation with longitudinally spaced parts of each equalizer member and regions of the axles adjacent the equalizer members such as would prevent relative transverse and longitudinal movement of the transom frame and the equalizer members, and links pivotally connecting the transom frame and the equalizer members for relatively unrestrained vertical movement and restrained relative transverse movement, any one link being pivotally connected to only one equalizer member.

29. A railway car truck construction comprising a pair of axles spaced and generally parallel to one another, equalizer members extending in generally parallel relation between the axles adjacent their ends and connected thereto in independent self-contained connections resisting unsquaring of the axles and the equalizer members, a load-carrying frame resiliently mounted on and extending between the equalizer members and being free of direct cooperation with longitudinally spaced parts of each equalizer member such as would prevent relative transverse and longitudinal movement of the load-carrying frame and the equalizer members, the load-carrying frame also being, except through the equalizer members, free of association with regions of the axles adjacent the equalizer members such as would prevent relative transverse and longitudinal movement of the truck-carrying frame and the equalizer members, and link means pivotally connecting the load-carrying frame and the equalizer members for restraining relative transverse movement and permitting relatively unrestrained vertical movement.

30. A railway car truck construction comprising a pair of axles spaced and generally parallel to one another, equalizer members extending in generally parallel relation between the axles adjacent their ends and connected thereto in independent self-contained connections resisting unsquaring of the axles ad the equalizer members, a load-carrying frame resiliently mounted on and extending between the equalizer members and being free of direct cooperation with longitudinally spaced parts of each equalizer member such as would prevent relative transverse and longitudinal movement of the load-carrying frame and equalizer members, the load-carrying frame also being, except through the equalizer members, free of association with regions of the axles adjacent the equalizer members such as would prevent relative transverse and longitudinal movement of the truck-carrying frame and the equalizer members, and links pivotally connecting the load-carrying frame and the equalizer members for restraining relative transverse movement and permitting relatively unrestrained vertical movement, any one link being pivotally connected to only one equalizer member.

31. In a railway truck, an axle and wheel, a journal box carried thereby, an equalizer supported upon the journal box and extending longitudinally of the truck, the equalizer and journal box being movable together vertically of the truck and being held against relative movement longitudinally of the truck, a load carrying truck frame spring-supported on the equalizer and free of association with the journal box except through the equalizer, and anchor means arranged adjacent the equalizer and the truck frame with the end portions connected, respectively, to an intermediate portion of the equalizer and to the truck frame to hold the equalizer and the truck frame against substantial movement relative to each other transversely of the truck but accommodating their movement relative to each other in a vertical direction.

32. In a railway truck, spaced wheeled axles, equalizers extending between and supported thereby, a truck frame supported by springs on the equalizers, a bolster, means supporting the bolster on the truck frame for movement relative thereto, and link devices extending longitudinally of the truck with the opposite ends of each device connected solely to the bolster and an equalizer respectively, said devices holding the bolster and equalizers against substantial relative movement longitudinally of the truck and accommodating their relative vertical movement.

33. In a railway truck, spaced wheeled axles with journal boxes, an equalizer extending between boxes spaced apart longitudinally of the truck, the equalizer having yoke-like ends resting on the tops of the associated boxes and embracing the opposite sides of the boxes to position the boxes longitudinally of the truck, a truck frame supported by springs on the equalizer, a bolster supported from the truck frame, and a cushioning device connected directly to the bolster and equalizer and positioning them relative to each other longitudinally of the truck independently of the truck frame and providing for relative vertical movement of the journal boxes, bolster and truck frame free of sliding engagement between said parts under longitudinal thrusts between the bolster and journal boxes.

34. A truck as described in claim 33 in which the support for the bolster includes swing hanger assemblies pivotally connected to the truck frame to provide for relative movement of the bolster and truck frame transversely of the truck, and the cushioning device and its connections to the bolster and equalizer accommodate such relative transverse movement.

35. In a railway vehicle, spaced wheeled axles, spaced equalizer frames extending transversely between and mounted on the axles, a transom frame extending between but free of rigid engagement with the axles and the equalizer frames, resilient means supporting the transom frame on the equalizer frames, hanger means pivotally mounted on and depending from the transom frame and arranged to swing transversely of the equalizer frames, a plank member carried by the hanger means and rockably mounted thereon, a bolster pivotally and solidly supported on said plank member for rocking movement relative thereto about an axis extending substantially parallel to the equalizer members, means yieldingly resisting rocking movement of the bolster on the plank member, and link means connected between the bolster and the equalizer frames resisting relative longitudinal movement therebetween while permitting relative vertical movement therebetween.

36. In a railway vehicle, spaced wheeled axles, spaced equalizer frames extending transversely between and mounted on the axles, a transom frame extending between but free of rigid engagement with the axles and the equalizer frames, resilient means supporting the transom frame on the equalizer frames, hanger means pivotally mounted on and depending from the transom frame and arranged to swing transversely of the equalizer frames, a plank member carried by the hanger means and rockably mounted thereon, a bolster piotally and solidly supported on said plank member for rocking movement relative thereto about an axis extending substantially parallel to the equalizer members, means yieldingly resisting rocking movement of the bolster on the plank member, link means connected between the bolster and the equalizer frames resisting relative longitudinal movement therebetween while permitting relative vertical movement therebetween, and link means connected between the transom frame and the equalizer frames resisting relative transverse movement therebetween while permitting relative vertical movement therebetween.

37. In a railway vehicle, spaced wheeled axles, spaced equalizer frames extending transversely between and mounted on the axles, a transom frame extending between but free of rigid engagement with the axles and the equalizer frames, resilient means supporting the transom frame on the equalizer frames, hanger means pivotally mounted on and depending from the transom frame and arranged to swing transversely of the equalizer frames, a plank member carried by the hanger means and rockably mounted thereon, a bolster pivotally and solidly supported on said plank member for rocking movement relative thereto about an axis extending substantially parallel to the equalizer members, means yieldingly resisting rocking movement of the bolster on the plank member, link means connected between the transom frame and the bolster resisting relative longitudinal movement therebetween while permitting relative rocking movement therebetween, and link means connected between the transom frame and the equalizer frames resisting relative longitudinal movement therebetween while permitting relative vertical movement therebetween.

38. In a railway vehicle, spaced wheeled axles, spaced equalizer frames extending transversely between and mounted on the axles, a transom frame extending between but free of rigid engagement with the axles and the equalizer frames, resilient means supporting the transom frame on the equalizer frames, hanger means pivotally mounted on and depending from the transom frame and arranged to swing transversely of the equalizer frames, a plank member carried by the hanger means and rockably mounted thereon, a bolster pivotally and solidly supported on said plank member for rocking movement relative thereto about an axis extending substantially parallel to the equalizer members, means yieldingly resisting rocking movement of the bolster on the plank member, link means connected between the transom frame and the bolster resisting relative longitudinal movement therebetween while permitting relative rocking movement therebeween, and link means connected between the transom frame and the equalizer frames resisting relative longitudinal movement therebetween while permitting relative vertical movement therebetween, and link means connected between the transom frame and an equalizer frame resisting relative transverse movement therebetween while permitting relative vertical movement therebetween.

39. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a beam member extending longitudinally of and resiliently mounted on each equalizer member, a transom frame resiliently mounted on and extending between the beam members and being free of direct cooperation with longitudinally spaced parts of each equalizer member and regions of the axles adjacent the equalizer members such as would prevent relative transverse and longitudinal movement of the transom frame and the equalizer members, and link means pivotally connecting the transom frame and the equalizer members for restraining relative transverse movement and permitting relatively unrestrained vertical movement.

40. A railway truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a beam member extending longitudinally of and resiliently mounted on each equalizer member, a transom frame resiliently mounted on and extending between the beam members and being free of direct cooperation with longitudinally spaced parts of each equalizer member and regions of the axles adjacent the equalizer members such as would prevent relative transverse and longitudinal movement of the transom frame and the equalizer members, and links pivotally connecting the transom frame and the equalizer members for relatively unrestrained vertical movement and restrained relative transverse movement, any one link being pivotally connected to only one equalizer member.

41. A railway car truck construction comprising a pair of axles spaced and generally parallel to one another, equalizer members extending in generally parallel relation between the axles adjacent their ends and connected thereto in independent self-contained connections resiliently resisting unsquaring of the axles and the equalizer members, a beam member extending longitudinally of and resiliently mounted on each equalizer member, a transom frame resiliently mounted on and extending between the beam members and being free of direct cooperation with longitudinally spaced parts of each equalizer member and regions of the axles adjacent the equalizer members such as would prevent relative transverse and longitudinal movement of the transom frame and the equalizer members, a first link means pivotally connecting the transom frame and the equalizer members for restraining relative transverse movement and permitting relatively unrestrained vertical movement, and a second link means pivotally connecting the transom frame and the equalizer members for restraining relative longitudinal movement and permitting relatively unrestrained vertical movement.

42. A railway car truck construction comprising a pair of axles spaced and generally parallel to one another, equalizer members extending in generally parallel relation between the axles adjacent their ends and connected thereto in independent self-contained connections resiliently resisting unsquaring of the axles of the equalizer members, a beam member extending longitudinally of and resiliently mounted on each equalizer member, a transom frame resiliently mounted on and extending between the beam members and being free of direct cooperation with longitudinally spaced parts of each equalizer member and regions of the axles adjacent the equalizer members such as would prevent relative transverse and longitudinal movement of the transom frame and the equalizer members, and links pivotally connecting the transom frame and the equalizer members for relatively unrestrained vertical movement and restrained relative transverse movement, any one link being pivotally connected to only one equalizer member, and link means pivotally connecting the transom frame and the equalizer members for restraining relative longitudinal movement and permitting relatively unrestrained vertical movement.

43. In a railroad car truck provided with equalizer units at opposite sides and provided with journal bearing receiving portions at the opposite ends thereof, wheel and axle units having journal bearings mounted in the journal bearing receiving portions, the equalizer units and journal bearings being movable together; a load carrying transom frame yieldingly supported on the equalizer units and free of association with the journal bearings except through the equalizer units; transversely disposed tie means having portions yieldingly secured to portions of the transom frame disposed between the equalizer frames, said tie means having other portions pivotally secured to the equalizer units; vertically movable, longitudinally extending, tie means pivotally secured at one side of the truck between an intermediate portion of the transom frame and a portion of one of the equalizer units intermediate the ends thereof whereby substantial rotative movement between the transom frame and the equalizer unit is prevented and a predetermined amount of relative movement in a vertical direction between the frame and the equalizer unit is permitted.

ROBERT N. JANEWAY.

REFERENCES CITED

The following references are of record in the file of this patent:

UNITED STATES PATENTS

| Number | Name | Date |
|---|---|---|
| 1,601,190 | Richardson | Sept. 28, 1926 |
| 2,190,761 | Anderson | Feb. 20, 1940 |
| 2,197,110 | Muchnic | Apr. 16, 1940 |
| 2,208,424 | Kjolseth | July 16, 1940 |
| 2,208,425 | Kjolseth | July 16, 1940 |
| 2,258,663 | Travilla | Oct. 14, 1941 |
| 2,263,310 | Piron | Nov. 18, 1941 |
| 2,268,267 | Sheesley | Dec. 30, 1941 |
| 2,274,484 | Janeway | Feb. 24, 1942 |
| 2,276,337 | Pflager | Mar. 17, 1942 |
| 2,290,779 | Tack | July 21, 1942 |
| 2,307,439 | White | Jan. 5, 1943 |
| 2,322,266 | Willoughby | June 22, 1943 |
| 2,323,348 | Nystrom et al. | July 6, 1943 |
| 2,331,174 | Carpenter | Oct. 5, 1943 |
| 2,334,024 | Nystrom et al. | Nov. 9, 1943 |
| 2,347,362 | Nystrom et al. | Apr. 25, 1944 |
| 2,350,567 | Nystrom et al | June 6, 1944 |
| 2,352,400 | Nystrom et al. | June 27, 1944 |
| 2,371,796 | Breer et al. | Mar. 20, 1945 |

Certificate of Correction

Patent No. 2,578,554 December 11, 1951

ROBERT N. JANEWAY

It is hereby certified that error appears in the printed specification of the above numbered patent requiring correction as follows:

Column 15, line 44, for "axes" read *axles*; column 17, line 37, for "ad the" read *and the*; line 44, before "equalizer" insert *the*; column 18, line 68, for "piotally" read *pivotally*; column 20, line 62, for "axles of" read *axles and*; and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*